Dec. 20, 1955   J. HENCHERT   2,727,652
SOLDER BONDED SIDE SEAM FOR A METAL CAN BODY
Filed Dec. 22, 1952
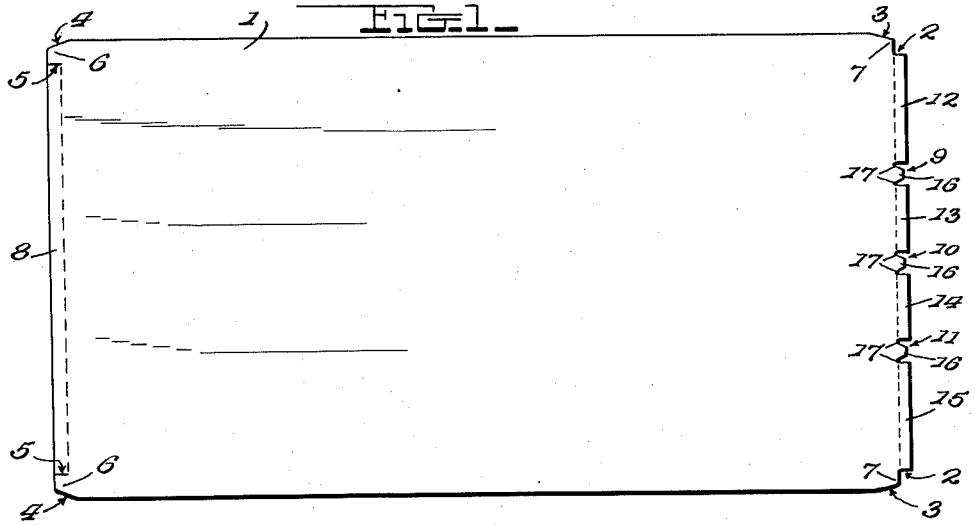
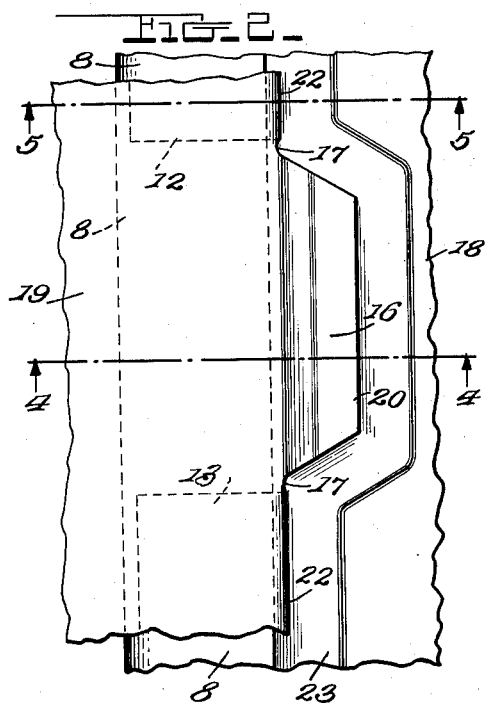
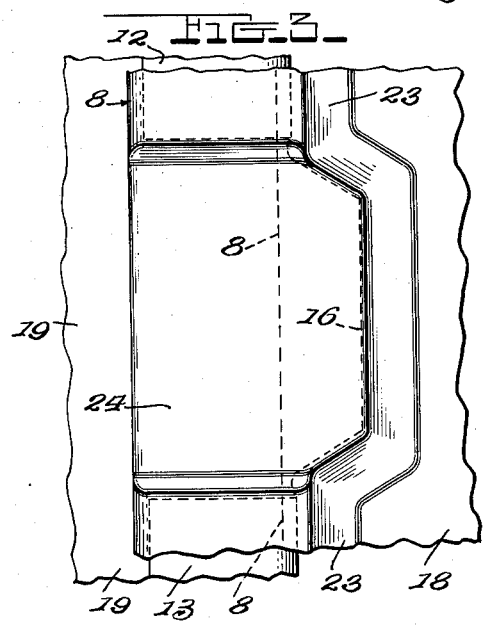
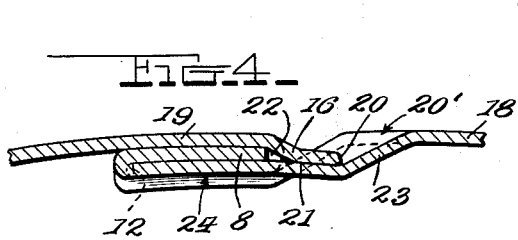
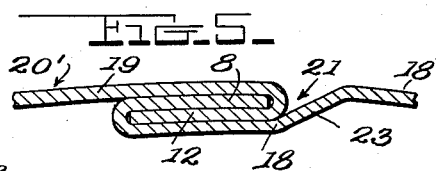
INVENTOR.
John Henchert
BY
Mason, Porter, Diller & Stewart
attys.

United States Patent Office 2,727,652
Patented Dec. 20, 1955

2,727,652

SOLDER BONDED SIDE SEAM FOR A METAL CAN BODY

John Henchert, River Forest, Ill., assignor to Continental Can Company, Inc., New York, N. Y., a corporation of New York Application December 22, 1952, Serial No. 327,213

2 Claims. (Cl. 220—77)

The invention relates to metal cans and more particularly to the solder bonded side seam joining the edge portions of the body forming blank.

An object of the invention is to provide a solder bonded side seam which is strengthened against unhinging, under excessive internal pressure, wherein the strengthening means is so disposed that it remains undisturbed during the wiping of excess solder from the seam area.

A further object of the invention is to provide a solder bonded side seam wherein there are a series of spaced outer hooks interlocked with a continuous inner hook and with lap portions between the hooks which lap portions extend laterally of the side seam and are bent inwardly and inset in the body wall carrying the inner hook to facilitate the wiping of surplus solder from the seam area after solder bonding without disturbing the solder bond joining the lateral extension to the body wall.

In the drawings, which show by way of illustration one embodiment of the invention, Figure 1 is a view of a body blank which has been notched and slit preparatory to forming hooks on the ends of the body blank and the forming of the body blank into cylindrical shape and interlocking the hooks to form the improved side seam;

Figure 2 is a plan view of a portion of the can body having the improved solder bonded side seam, said view being taken from the outside of the can body;

Figure 3 is a plan view of a portion of a can body with the improved side seam, said view being taken from the inside of the can body;

Figure 4 is a sectional view on the line 4, 4, and

Figure 5 is a sectional view on the line 5, 5.

The present invention contemplates the provision of a solder bonded side seam capable of withstanding the high internal pressures developed in some liquids such as beer when enclosed and hermetically sealed in the can and pasteurized or otherwise treated.

In Figure 1, there is shown a body blank 1 which is notched and slit so as to permit the body blank to be shaped into can body form and the end portions of the blank joined by the improved solder bonded side seam. At one end the blank is notched at 2, 2 and clipped at 3, 3. At the other end the body blank is clipped at 4, 4 and slit at 5, 5. This provides an inner lap 6, 6. At the other end of the can body blank are outer laps 7, 7. These lap portions 6 and 7 are at the ends of the side seam and constitute two thicknesses of metal only which can be flanged and formed into the double seam for joining the ends to the can body. These lap sections at the ends of the side seam are of the usual construction. The body blank at the left end thereof is turned outwardly and thence inwardly to form the inner hook 8 which extends as one continuous hook from the slit at one end of the side seam to the slit 5 at the other end of the side seam.

At the other end of the body blank the end portion is cut away at 9, 10 and 11 so as to provide spaced hooks 12, 13, 14 and 15. These hook portions are bent inwardly to form outer hooks. In the cut-away portion 9 the body wall is provided with a lateral extension 16 with notches 17, 17 along the side thereof. The cut-away portion 10 has a similar extension 16 and notches 17, 17. Likewise, the cut-away portion 11 has a similar extension 16 and notches 17, 17.

Figure 5 of the drawing shows a section through the interlocked hooks. The inner hook is indicated at 8 and the outer hook at 12.

Figure 4 is a sectional view through the lateral extension disposed between the ends of the hooks 12 and 13, said lateral extension 16 is gradually bent inwardly toward the body wall 18 carrying the inner hook 8. The horn on which the can body blank is formed is so shaped that when the bumping iron contacts the seam portions the body wall will be bent outwardly in the regions of the extension until it is in contact with the inner hook and the inner hook in intimate contact with the outer body wall 19. At the same time the bumping iron is so shaped that the extension 16 will be bent gradually downwardly over the free edge of the inner hook 8, and the end portion 20 thereof inset into the body wall 18. In fact the body wall 18 is slightly bent inwardly where it is contacted with by the end portion 20 of the extension to an extent substantially twice the thickness of the body wall. This places the end portion 20 of the extension well below the outer surface of the can body which is indicated at 20'.

The lateral extension 16 is of sufficient length so as to extend across the solder opening 21 (see Fig. 5). This lateral extension will be solder bonded to the body wall 18 in which it is inset and there will be a solder bead extending all around the extension so as to cover the raw edges and firmly bond the extension to the body wall. This shaping of the extension brings it sufficiently close to the body wall throughout the length thereof so that the solder will sweat in beneath the same as the seam is solder bonded. The extension extends beyond the base 22 of the outer hooks and will firmly lock said hooks so that excessive internal pressure will not cause the seam parts to unhinge.

After the side seam has been solder bonded it is desirable to pass the can body beneath solder wipers which remove surplus solder from the outer face of the can body in the seam area. This, of course, reclaiming of the excess solder, takes place soon after the bonding solder is applied and while it is in a soft condition. By the improved side seam the lap portion 16 is well beneath the outer surface of the side seam and, therefore, the solder wiping devices will not disturb these extensions and disrupt the solder bond joining the same to the body wall.

Figure 2 is a plan view of a portion of the solder bonded side seam viewed from the outside of the can. The extension 16 is shown as extending laterally beyond the base 22 of the outer hooks and is inset into the body wall 18 carrying the inner hook. The sides of the extensions are tapered so as to provide the notches 17, 17 which facilitates venting during solder bonding.

Figure 3 is an inside plan view of a portion of the seam. The interlocked hook portions are offset inwardly as indicated at 23 and in the region of the extension the seam parts are offset outwardly as indicated at 24. The body wall is offset inwardly to receive the inwardly bent portion of the extension 16.

The resulting can body solder bonded side seam is much stronger because of this extension which is inset into the body portion at one side of the seam and this provides a can body suitable for packaging beer where great internal pressures often develop.

I claim:

1. A sheet metal can comprising a body formed from a body blank having the edge portions thereof joined by a solder bonded side seam including lap portions at the ends of the side seam, an inner hook extending all the way from the inner lap section at one end of the seam to the inner lap section at the other end of the seam and of uniform width from end to end, a series of spaced outer hooks disposed between the outer lap portions at the ends of the side seam and adapted to engage said inner hook, the metal between said outer spaced hooks being extended laterally of the side seam beyond the inner hook end and the base of the outer hook and gradually bent inwardly over the free edge of the inner hook, the end portion of said lateral extension being inset into the body wall carrying the inner hook to an extent substantially twice the thickness of the body wall to facilitate the wiping of surplus solder from the seam after solder bonding without disturbing the lateral extension and the solder bond joining the lateral extension to said body wall.

2. A sheet metal can comprising a body formed from a body blank having the edge portion thereof joined by a solder bonded side seam including lap portions at the ends of the side seam, an inner hook extending all the way from the inner lap section at one end of the seam to the inner lap section at the other end of the seam and of uniform width from end to end, a series of spaced outer hooks disposed between the outer lap portions at the ends of the side seam and adapted to engage said inner hook, the metal between said outer spaced hooks being extended laterally of the side seam beyond the inner hook end and the base of the outer hook and gradually bent inwardly over the free edge of the inner hook, the end portion of said lateral extension being inset into the body wall carrying the inner hook to an extent substantially twice the thickness of the body wall to facilitate the wiping of surplus solder from the seam after solder bonding without disturbing the lateral extension and the solder bond joining the lateral extension to said body wall, the metal in the seam between the spaced hooks being pressed outward to bring the inner body wall and the hook into intimate contact to facilitate solder bonding.

References Cited in the file of this patent

UNITED STATES PATENTS

| | | |
|---|---|---|
| 2,259,498 | Taylor | Oct. 21, 1941 |
| 2,452,071 | Saubestre | Oct. 26, 1948 |